Dec. 30, 1941.　　　W. TRAUPEL　　　2,268,270
GAS TURBINE PLANT
Filed Nov 25, 1939
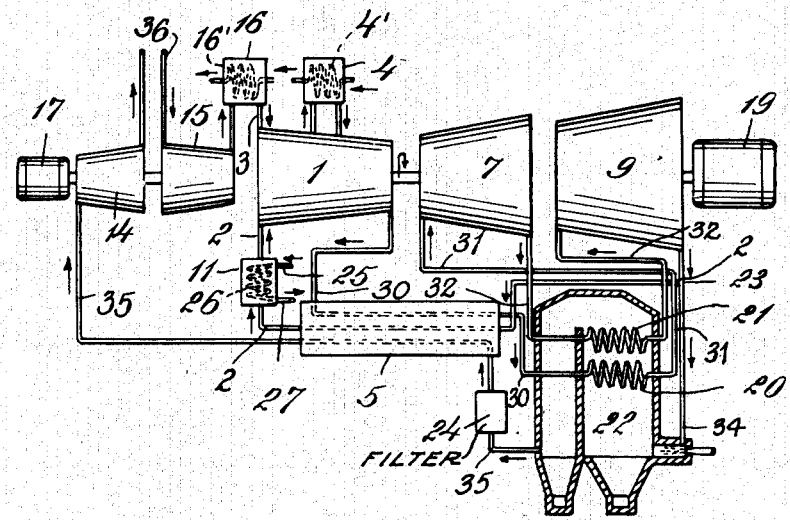
INVENTOR
Walter Traupel
BY
Pennie, Davis, Marvin & Edmonds
ATTORNEYS Patented Dec. 30, 1941

2,268,270

UNITED STATES PATENT OFFICE 2,268,270

GAS TURBINE PLANT

Walter Traupel, Winterthur, Switzerland, assignor to Sulzer Frères, Société Anonyme, Winterthur, Switzerland Application November 25, 1939, Serial No. 306,056
In Switzerland December 13, 1938

7 Claims. (Cl. 60—41)

The invention relates to a gas turbine plant consisting of a compressor in which the oxygen-containing gaseous working medium is compressed, a gas heater in which the compressed gas is heated by heat exchange, a turbine in which the compressed, heated gas expands, means for leading back into the said compressor the gas expanded in the turbine, an auxiliary compressor which compresses air and supplies it to the compressor, means for driving the auxiliary compressor, and a conduit through which a portion of the gas expanded in the turbine is led into the combustion chamber of the gas heater in order to serve as combustion air. That portion of the gas which after expansion in the turbine is led back again into the compressor, accordingly describes a cycle and this cycle takes place completely under overpressure. In the conduit system, through which the gas is led back into the compressor, there is provided a cooler in which it is cooled to the lowest temperature possible. That portion of the gas which, after expansion in the turbine passes into the combustion chamber of the gas heater, consequently also has a pressure higher than atmospheric pressure so that very favorable conditions for the combustion and the heat exchange result.

Appropriately the combustion gas leaving the gas heater is led into an auxiliary turbine which drives the said auxiliary compressor. To increase the efficiency of the plant it is furthermore advisable to lead the gas expanded in the turbine, which is led back into the compressor, through a heat exchanger in which it gives off a portion of its heat to the gas which flows from the compressor to the gas heater. In the same way also the combustion gas, which flows from the gas heater to the auxiliary turbine, may be led through a heat exchanger where it gives off heat to the air coming from the compressor. A further means for improving the efficiency includes a high pressure and a low pressure turbine, and in heating the gas flowing from the high pressure turbine to the low pressure turbine in the gas heater by heat exchange.

It is evident that, especially in the case of large plants, the individual parts of the plant can be divided into several units, for example, into two gas heaters.

Among the advantages which a plant of this kind possesses, the following are to be named particularly. As the combustion is carried out under pressure, the conditions in the gas heater are so favorable that combustion chamber and heat exchange surfaces become very small. The gas flowing in the cycle contains no combustion residues so that contaminations of the plant are avoided to a very large extent. In such plants a regulation of output can be effected advantageously by change of the pressure level in the cycle by suitable regulation of the speed of the auxiliary compressor.

The single figure of the accompanying drawing illustrates more or less diagrammatically an arrangement of apparatus embodying the invention.

Turbo-compressor 1 compresses the gaseous working medium which flows through pipes 2 and 3. The compression is effected with intermediate cooling, for which a cooler 4 having a cooling coil 4' is provided. The compressed working gas containing oxygen passes then to pipe 30 and afterwards through heat-exchanger 5, where it is warmed by the exhaust heat, into pipe system 20 of gas heater 22, in order to be heated up to the necessary maximum temperature. The heated gaseous working medium flows through pipe 31 into the high-pressure turbine 7, which drives the compressor 1. Through pipe 32 the partly expanded working medium is led into the pipe system 21 of the gas heater 22 and, again in a reheated state, is conducted by conduit 32 to the low-pressure turbine 9 which drives the generator 19. The turbines 7 and 9 wherein the working medium expands comprise a turbine system. The gas containing oxygen and issuing from the low-pressure turbine has still a pressure above atmospheric and flows through pipe 2 and heat-exchanger 5 and cooler 11 back again into compressor 1. In the heat-exchanger 5 the returning working medium gives up a part of its heat in countercurrent to the compressed working medium coming from blower 1 through pipe 30. In the cooler 11 the working medium is then fully cooled by means of the pipe system 26, the cooling medium to the cooler entering through pipe 25. After being cooled down the gas is again led into blower 1.

At 23 a part of the gas is taken from the working cycle through the pipe 34 in order to serve as combustion air in the gas heater. The combustion gases produced in the combustion space of gas heater 22 pass into the auxiliary turbine 14 through pipe 35, a filter 24 and heat-exchanger 5. This auxiliary turbine 14 is consequently the only part of the whole plant through which the combustion gases flow, since the combustion gases do not come into contact with the other machines. For this reason it is possible to work the plant also with fuels which form fly coke and fly ash, since it is possible sufficiently to cool and to filter this small part of the gas before it enters auxiliary turbine 14.

In order to replace the quantity of gas removed through pipe 34, an additional quantity of air led in through pipe 36 is compressed by means of the auxiliary compressor 15 and introduced through pipe 3 and cooler 16 into the working cycle. Cooler 16 has a coil 16' through which a cooling medium flows as shown by the arrows.

I claim:

1. A gas turbine plant which comprises a turbo-compressor for compressing a working gas, a turbine system in which the working gas is expanded arranged to drive the compressor and another load, a conduit for passing the compressed working gas from the turbo-compressor to the turbine system, a pipe connecting the turbine system with the turbo-compressor for passing the working gas expanded in the turbine system back to the turbo-compressor, means for cooling the working gas passing from the turbine system through the pipe, an auxiliary turbine, an auxiliary compressor connected to and driven by the auxiliary turbine, a combustion heating means, a branch pipe connecting the turbine system to the combustion heating means whereby a part of the expanded working gas from the turbine system is used for combustion, means for passing the combustion gas in heat exchange relation with gas passing through the conduit from the turbo-compressor to the turbine system, means for passing the combustion gas to the auxiliary turbine to drive the auxiliary turbine, means for discharging the combustion gas used to drive the auxiliary turbine to the atmosphere, means for passing air from the atmosphere into the auxiliary compressor, and means for cooling the air compressed in the auxiliary compressor and passing it into the turbo-compressor.

2. A gas turbine plant according to claim 1 which comprises a heat exchanger arranged to cool the working gas passing from the turbine system through the pipe to the turbo-compressor and to heat the working gas passing through the conduit from the turbo-compressor to the turbine system.

3. A gas turbine plant according to claim 1 in which the turbine system comprises a high-pressure turbine and a low-pressure turbine, and a combustion heating means provided with means to heat the working gas passing from the turbo-compressor to the high-pressure turbine and to heat the working gas passing from the high-pressure turbine to the low-pressure turbine.

4. A gas turbine plant which comprises a compressor for compressing a working gas, a gas heater, means for passing the compressed working gas from the compressor for heat exchange contact into the gas heater to increase the temperature of the compressed working gas, a turbine system, means for passing the compressed heated working gas into the turbine system wherein it expands, means for returning working gas expanded in the turbine system into the said compressor, an auxiliary compressor arranged to compress air and pass it into the said compressor, means for driving the auxiliary compressor, and a conduit for passing a part of the working gas expanded in the turbine system into the gas heater to serve as combustion air.

5. A gas turbine plant according to claim 4 which comprises a circuit conduit system through which the working gas flows in a working cycle and above atmospheric pressure from the compressor to the gas heater, to the high-pressure turbine and back to the compressor, and a heat exchanger through which the working gas passing from the compressor to the gas heater passes in heat-exchange relation to the working gas passing from the high-pressure turbine back to the compressor.

6. A gas turbine plant according to claim 4 which comprises an auxiliary turbine connected to and arranged to drive the auxiliary compressor, and conduit means for passing combustion gases from the gas heater to the auxiliary turbine.

7. A gas turbine plant according to claim 4 which comprises means for supplying the auxiliary compressor with air from the atmosphere and a heat exchanger in which the combustion gases and the working gas pass in heat exchange relation.

WALTER TRAUPEL.